(12) United States Patent
Graves et al.

(10) Patent No.: US 7,861,021 B2
(45) Date of Patent: Dec. 28, 2010

(54) DEVICE RECEIVING UNIT THAT PERFORMS A DETERMINATION BASED ON DATA EXCHANGE WHICH INTERFACING DEVICE TAKES PRECEDENCE WHEN A PLURALITY OF INTERFACING DEVICES ARE SIMULTANEOUSLY CONNECTED

(75) Inventors: Jason James Graves, Tucson, AZ (US); Kevan D. Holdaway, Hillsborough, NC (US); Nhu Thanh Nguyen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 166 days.

(21) Appl. No.: 12/019,416

(22) Filed: Jan. 24, 2008

(65) Prior Publication Data
US 2009/0193150 A1 Jul. 30, 2009

(51) Int. Cl.
*G06F 3/00* (2006.01)
*G06F 13/38* (2006.01)

(52) U.S. Cl. ............... 710/74; 710/3; 710/15; 710/62; 710/72; 710/110; 711/114; 711/115; 709/202; 709/203

(58) Field of Classification Search ............ 710/3, 710/72, 74, 62, 15, 110; 711/114, 115, 170; 709/203, 202
See application file for complete search history.

(56) References Cited

U.S. PATENT DOCUMENTS

| 6,289,405 | B1 | 9/2001 | Movall et al. |
| 6,892,316 | B2 | 5/2005 | Eide et al. |
| 6,922,709 | B2 | 7/2005 | Goodman |
| 6,973,412 | B2 | 12/2005 | King et al. |
| 7,103,743 | B2 * | 9/2006 | Goldschmidt ............... 711/170 |
| 7,149,820 | B2 | 12/2006 | Haswarey et al. |
| 7,159,140 | B2 | 1/2007 | Greco et al. |
| 7,168,007 | B2 | 1/2007 | Gilstrap et al. |
| 7,565,488 | B2 * | 7/2009 | Fujie et al. ................ 711/114 |
| 7,577,778 | B2 * | 8/2009 | Ni et al. ....................... 710/74 |
| 2004/0024831 | A1 * | 2/2004 | Yang et al. ................. 709/208 |
| 2004/0257998 | A1 * | 12/2004 | Chu et al. .................. 370/252 |
| 2006/0265449 | A1 * | 11/2006 | Uemura et al. ............. 709/203 |

OTHER PUBLICATIONS

Watts, et al., "IBM BladeCenter Products and Technology", IBM Corporation, Document No. SG24-7523-00, Aug. 2007, Part 1, total number of p. 155.
Watts, et al., "IBM BladeCenter Products and Technology", IBM Corporation, Document No. SG24-7523-00, Aug. 2007, Part 2, total number of pp. 155.

* cited by examiner

*Primary Examiner*—Tammara Peyton
(74) *Attorney, Agent, or Firm*—Rabindranath Dutta; Konrad Raynes & Victor LLP (57) ABSTRACT

Provided are a method, system, and article of manufacture, wherein a persistent storage is maintained in a device receiving unit that is capable of receiving one or more devices. The device receiving unit receives a device that includes device specific information that identifies the device. The device is interfaced with the device receiving unit. The persistent storage is updated with the device specific information that identifies the device, in response to the interfacing of the device with the device receiving unit.

16 Claims, 5 Drawing Sheets

DEVICE RECEIVING UNIT THAT PERFORMS A DETERMINATION BASED ON DATA EXCHANGE WHICH INTERFACING DEVICE TAKES PRECEDENCE WHEN A PLURALITY OF INTERFACING DEVICES ARE SIMULTANEOUSLY CONNECTED

BACKGROUND

1. Field

The disclosure relates to a method, system, and article of manufacture for interfacing devices that include device specific information to a device receiving unit.

2. Background

Blade servers are servers that provide a multi-module environment in which a plurality of components may be added or replaced. A blade enclosure may provide services such as power, cooling, networking, etc., and such services may be used by the plurality of components within the blade enclosure.

The IBM BladeCenter* (e.g., BladeCenter S or BC-S) provides an exemplary multi-module environment in which components may be added or replaced. These new or replacement components may include vital product data (VPD) written at the factory. The VPD may comprise information that are specific to a particular component, such as, Media Access Control (MAC) address, license key, storage specifications, etc. Further details of the BladeCenter may be found in the publication entitled "IBM* BladeCenter Products and Technology" published by the International Business Machines Corporation in August 2007.

*IBM and BladeCenter are trademarks or registered trademarks of the International Business Machines Corporation in the United States and/or other countries.

SUMMARY OF THE DESCRIBED EMBODIMENTS

Provided are a method, system, and article of manufacture, wherein a persistent storage is maintained in a device receiving unit that is capable of receiving one or more devices. The device receiving unit receives a device that includes device specific information that identifies the device. The device is interfaced with the device receiving unit. The persistent storage is updated with the device specific information that identifies the device, in response to the interfacing of the device with the device receiving unit.

In certain embodiments, the device receiving unit comprises a chassis having storage devices and receptacles for storing received devices. The device is a redundant array of independent disks (RAID) switch with a controller card and the device specific information comprises vital product data (VPD) that identifies the device.

In further embodiments, the device is a first device, wherein the device receiving unit receives a second device at the same time as the first device. A determination is made via a first information exchange between the first device and the device receiving unit and via second information exchange between the second device and the device receiving unit, as to which of the first device and the second device has precedence, wherein potential race conditions are prevented from occurring.

In additional embodiments, the persistent storage is a centralized storage within the device receiving unit, wherein the device specific information used to update the centralized storage is accessible to a plurality of components in the device receiving unit.

In further embodiments, the device receiving unit has a plurality of receptacles for storing a plurality of devices, wherein an earlier stored device may be replaced by a new device in the device receiving unit.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made. In particular, while certain exemplary embodiments have been illustrated with reference to a BladeCenter S (BC-S), other device receiving unit besides a BC-S may also be used.

In the case of a BladeCenter S (BC-S) chassis, the BC-S chassis may already include data about a plurality of modules except for a new redundant array of independent disks (RAID) module that is being added to the BC-S chassis. The BC-S may already have hard disk drives in the chassis while the new RAID module has not been added. Certain embodiments allow VPD information related to the modules to be added and stored on a centralized storage item, such as a media tray in the BC-S chassis.

In certain embodiments, the media tray in the BC-S chassis may also act as a tie-breaker to external modules because the media tray stores common storage information. Therefore, when one of the modules is not in synchronization, validation and updates may need to be performed by using the VPD that is currently on the media tray. As a result, the media tray has to be up-to-date with any changes to the external modules. In certain embodiments, the VPD is included on a centralized storage item like the media tray because by storing the VPD information centrally, the VPD information may be used by multiple components that may normally not have access to the VPD information. Certain embodiments allow the update of VPD information from newly added or replaced modules to a centralized storage item, also referred to as a persistent storage, in the BC-S.

In certain exemplary embodiments in a BC-S environment, when a RAID module which includes a RAID switch with a baseboard management controller (BMC) is added to the BC-S chassis, a new VPD needs to be written to the media tray. Certain embodiments include checks to determine the state of the addition of the RAID module in order to identify whether a new module or a replacement module is being added to the BC-S chassis. Determining the state of the addition is important, because if a replacement RAID module is being added, then the BMC will perform an updating of the VPD to the media tray as opposed to a writing of new data. Additionally, in certain embodiments where two RAID modules are inserted at the same time, a management module (MM) included in the BC-S may determine which of the two RAID modules has priority for power as there can only be one write operation at any given time.

Exemplary Embodiments

Figure 1:
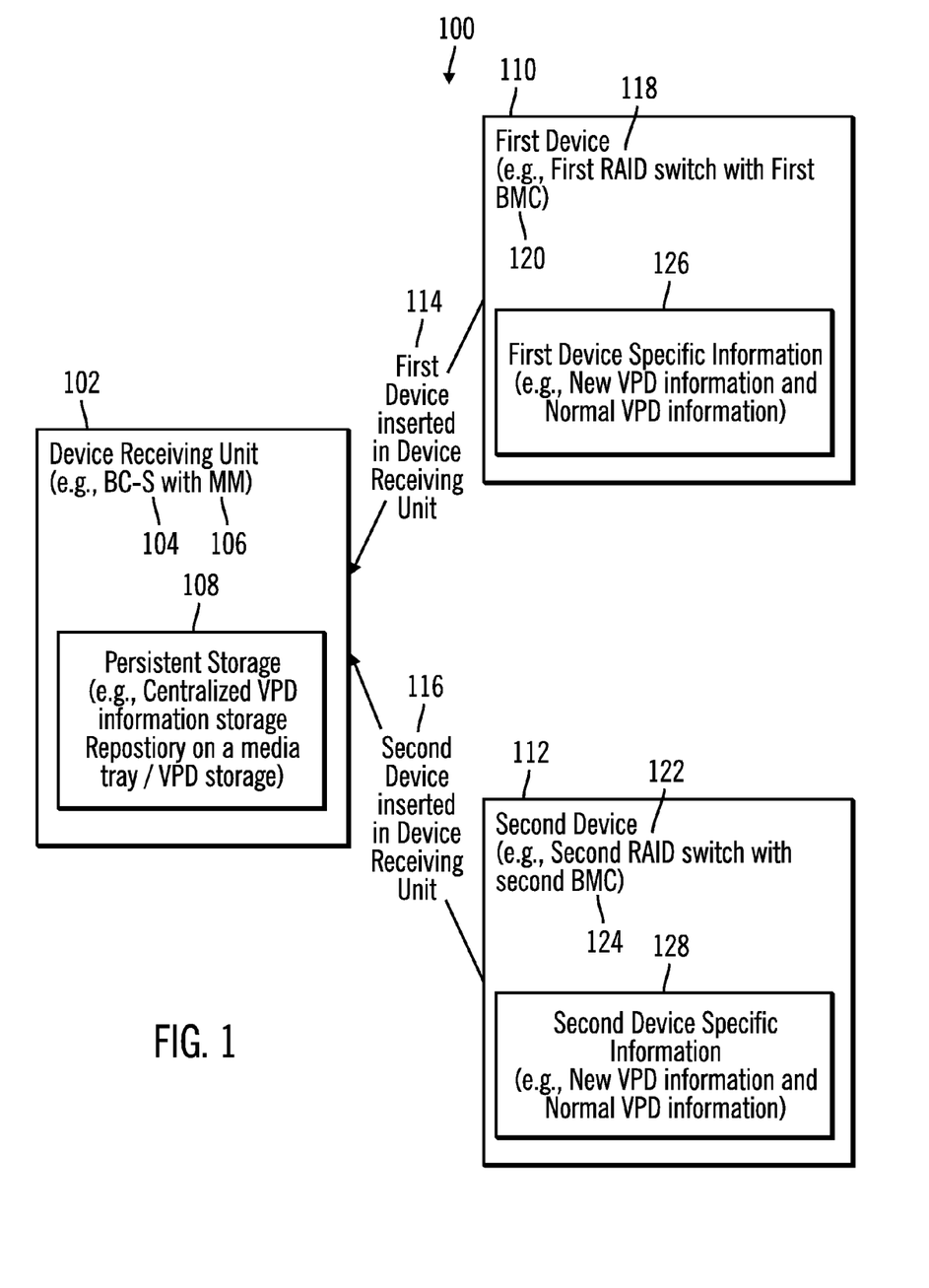
FIG. 1 illustrates a block diagram of a computing environment in accordance with certain embodiments.

FIG. 1 illustrates a block diagram of a computing environment 100 in accordance with certain embodiments. A device receiving unit 102 may comprise a BC-S 104 with a management module (MM) 106. In alternative embodiments, the device receiving unit 102 may comprise any device receiving unit which can receive two or more devices for potential inclusion within the device receiving unit.

The device receiving unit 102 may include a persistent storage 108, wherein a persistent storage stores data over an extended period of time and may be implemented as a non-volatile storage. In certain embodiments, the persistent storage 108 may comprise a centralized VPD information storage repository within the device receiving unit 102.

A first device 110 and a second device 112 may be inserted (reference numerals 114, 116) into the device receiving unit 102. In certain embodiments, the first device 110 may comprise a first RAID switch 118 with a first BMC 120, and the second device 112 may comprise a second RAID switch 122 with a second BMC 124.

The first device 110 may include first device specific information 126 and the second device 112 may include second device specific information 128. The device specific information 126, 128 may include new VPD information and regular VPD information included at the time of manufacture of the first and second devices 110, 112.

In certain exemplary embodiments, the BMC 120 on the RAID switch 118 has a set of data that contains the new information that may have to be written to an external storage location, i.e., the persistent storage 108. The BC-S 104 has a VPD storage 108 on a media tray that contains normal media tray data but the VPD storage 108 on the media tray can be accessed and used to store the new information required for using the RAID switch 118.

Figure 2:
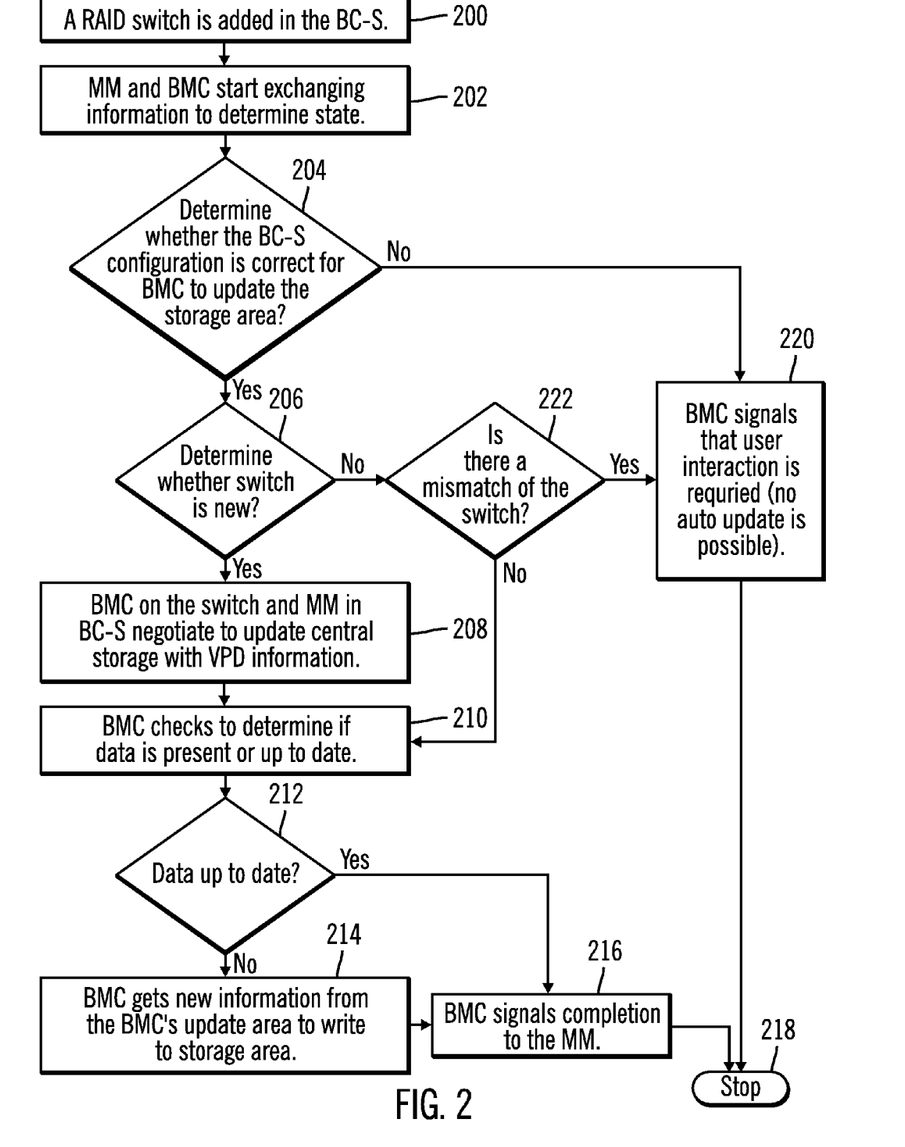
FIG. 2 illustrates a flowchart that shows operations that take place when a device is added to a device receiving unit, in accordance with certain embodiments.

FIG. 2 illustrates a flowchart that shows operations that take place when a device 110 is added to a device receiving unit 102, in accordance with certain embodiments.

Control starts at block 200 where a RAID switch 118 that comprises the first device 110 is added to the BC-S 104 that comprises the device receiving unit 102. At block 202, the management module 106 of the BC-S 104 and the BMC 120 of the RAID switch 118 start exchanging information to determine if the configuration is correct and to determine the state of the system. Possible states could be that the RAID switch 110 is a new or a replacement RAID switch or that the BC-S 104 chassis is a new or a replacement chassis.

Control proceeds to block 204, where it is determined whether the configuration of the BC-S 104 is correct for the BMC 120 to update the persistent storage 108. If so, a determination (at block 206) is made as to whether the RAID switch 118 is new. If the RAID switch 118 is determined to be new then the BMC 120 in the RAID switch 118 and the MM 106 in BC-S 104 negotiate to update (at block 208) the persistent storage (centralized VPD information storage repository) 108 with the VPD information (i.e., the first device specific information 126) corresponding to the RAID switch 118. Control proceeds to block 210 where the BMC 120 checks to determine whether the data is present or up to date. If the data is not (at block 212) up to date then the BMC 120 secures new information from the BMC's update area to write (at block 214) to storage, The BMC 120 signals (at block 216) completion to the MM 106 and the process stops (at block 218)

If at block 204, it is determined that the BC-S configuration is not correct for the BMC 120 to update the storage area then the BMC 120 signals (at block 220) that user interaction is needed because no automatic update is possible and the control stops (at block 218).

If the switch is determined (at block 206) as not new then a determination is made (at block 222) as to whether there is a mismatch of the switch. If so, control proceeds to block 220 and if not control proceeds to block 210. Additionally control can also proceed from block 212 to block 216 if the data is determined as not up to date at block 212.

Therefore, FIG. 2 illustrates certain embodiments in which the BMC 120 on the RAID switch 120 and the MM 106 in the BC-S 104 negotiate to update the persistent storage 108 with VPD information of the RAID switch 120.

Figure 3:
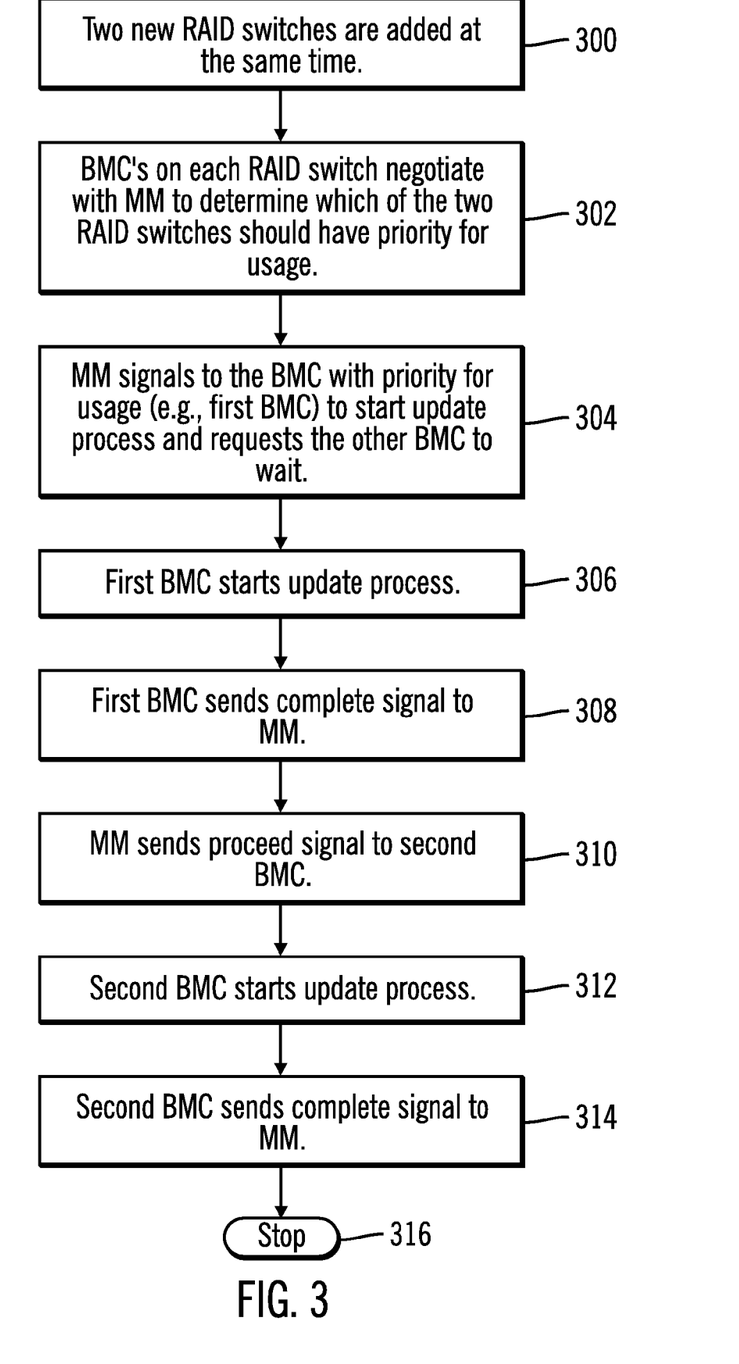
FIG. 3 illustrates a flowchart that shows operations that take place when two devices are added at the same to time to a device receiving unit, in accordance with certain embodiments.

FIG. 3 illustrates a flowchart that shows operations that take place when two devices 110, 112 are added at the same to time to a device receiving unit 102, in accordance with certain embodiments.

It is important that both devices 110, 112 not be allowed to update the persistent storage 108 at the same time or else the data may be corrupted via race conditions. The operations of FIG. 3 show that the MM 106 will enable only one of the BMC's (e.g., BMC 120) to update the persistent storage 108 and the other BMC (e.g., BMC 124) has to wait. When the update by the first BMC is complete, then the second BMC can examine the state of the persistent storage 108 to determine whether further updated VPD information is needed or whether the process can be completed immediately.

In FIG. 3, control starts at block 300 in which two new RAID switches 118, 122 are added to the BC-S 104 at the same time. BMC's 120,124 on the RAID switches 118, 122 negotiate (at block 302) with the MM 106 to determine which of the two RAID switches 118, 122 should have priority for usage.

If it is determined that the first BMC 120 should have priority for usage, then the MM 106 signals (at block 304) to the first BMC 120 to start update process and requests the second BMC 124 to wait. The first BMC 120 starts (block 306) the update process and on completion of update of the persistent storage 108 sends (at block 308) a complete signal to the MM 106.

The MM 106 then sends (at block 310) sends a proceed signal to the second BMC 124 that was waiting. The second BMC 124 starts (at block 312) the update process to update the persistent storage 108 and on completion sends (at block 314) a completion signal to the MM 106. Subsequently the process stops (at block 316).

Therefore, FIG. 3 illustrates how race conditions are prevented by prioritizing one device over another for interfacing to the device receiving unit 102 in order to prevent race conditions from occurring.

Figure 4:
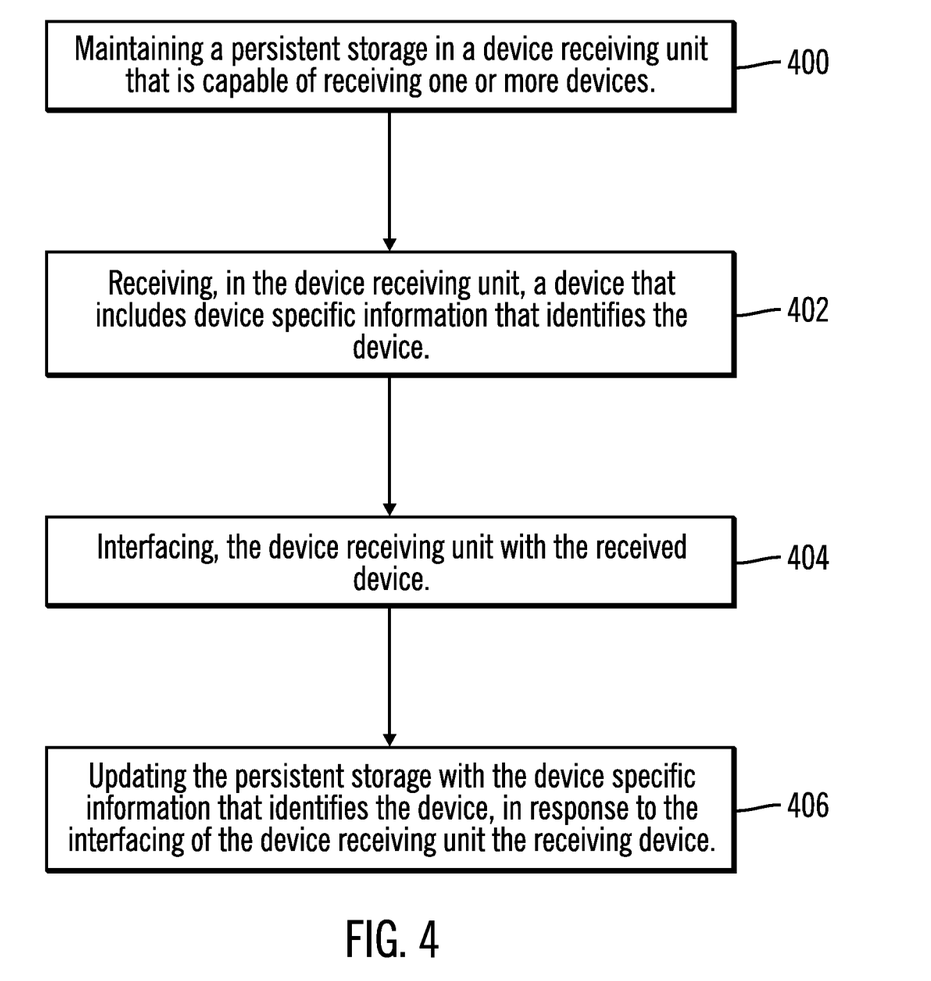
FIG. 4 illustrates a flowchart that shows operations for interfacing devices that include device specific information to a device receiving unit, in accordance with certain embodiments.

FIG. 4 illustrates a flowchart that shows operations for interfacing devices 110, 112 that include device specific information to a device receiving unit 102, in accordance with certain embodiments.

Control starts at block 400, wherein a persistent storage 108 is maintained in a device receiving unit 102 that is capable of receiving one or more devices 110. The device receiving unit 102 receives a device 110 that includes device specific information 126 that identifies the device 110. The device 110 is interfaced with the device receiving unit 102. The persistent storage 108 is updated with the device specific information t126 that identifies the device, in response to the interfacing of the device 110 with the device receiving unit 102.

In certain embodiments, the device receiving unit 102 comprises a chassis having storage devices and receptacles for storing received devices 110, 112. The device may be a redundant array of independent disks (RAID) switch with a controller card (e.g., BMC 120) and the device specific information comprises vital product data that identifies the device.

In further embodiments, the device is a first device 110, wherein the device receiving unit 102 receives a second device 112 at the same time as the first device 110. A determination is made via a first information exchange between the first device 110 and the device receiving unit 102 and via second information exchange between the second device 112 and the device receiving unit 102, as to which of the first device 110 and the second device 112 has precedence, wherein potential race conditions are prevented from occurring.

In additional embodiments, the persistent storage 108 is a centralized storage 108 within the device receiving unit 102, wherein the device specific information used to update the centralized storage is accessible to a plurality of components in the device receiving unit.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 5:
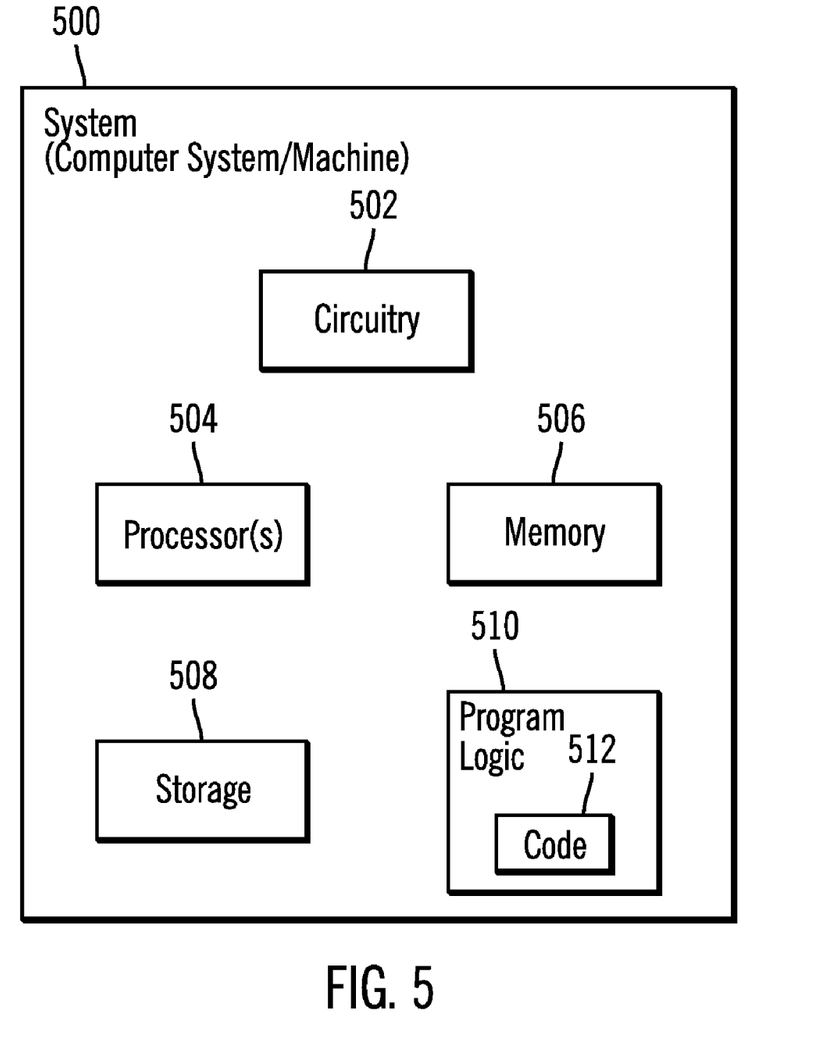
FIG. 5 illustrates the architecture of computing system, wherein in certain embodiments elements of the computing environment of FIG. 1 may be implemented in accordance with the architecture of the computing system.

FIG. 5 illustrates an exemplary computer system 500, wherein in certain embodiments the device receiving unit 102 and the devices 110, 112 of the computing environment 100 of FIG. 1 may be implemented in accordance with the computer architecture of the computer system 500. The computer system 500 may also be referred to as a system, and may include a circuitry 502 that may in certain embodiments include a processor 504. The system 500 may also include a memory 506 (e.g., a volatile memory device), and storage 508. Certain elements of the system 500 may or may not be found in the device receiving unit 102 and the devices 110, 112 of FIG. 1. The storage 508 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 508 may comprise an internal storage device, an attached storage device and/or a network accessible storage device. The system 500 may include a program logic 510 including code 512 that may be loaded into the memory 506 and executed by the processor 504 or circuitry 502. In certain embodiments, the program logic 510 including code 512 may be stored in the storage 508. In certain other embodiments, the program logic 510 may be implemented in the circuitry 502. Therefore, while FIG. 5 shows the program logic 510 separately from the other elements, the program logic 510 may be implemented in the memory 506 and/or the circuitry 502.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIG. 5 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-5 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
   maintaining a persistent storage in a device receiving unit that is configurable to receive one or more devices;
   receiving, in the device receiving unit, a first device that includes device specific information that identifies the first device, and also receiving, at the device receiving unit, a second device at the same time as the first device;
   determining, via first information exchange between the first device and the device receiving unit and via second information exchange between the second device and the device receiving unit, which of the first device and the second device has precedence;
   in response to determining, that the first device has precedence, starting updating of the persistent storage of the device receiving unit via the first device;
   in response to completion of the updating of the persistent storage of the device receiving unit by the first device, sending, by the device receiving unit, a proceed signal to the second device; and
   in response to the sending of the proceed signal to the second device, starting updating of the persistent storage of the device receiving unit via the second device, and in response to completion via the second device of the updating, sending a completion signal to the device receiving unit.

2. The method of claim 1, wherein:
   the device receiving unit comprises a chassis having storage devices and receptacles for storing received devices;
   the device is a redundant array of independent disks (RAID) switch with a controller card;
   the device specific information comprises vital product data (VPD) that identifies the device.

3. The method of claim 1, wherein the persistent storage is a centralized storage within the device receiving unit, and wherein the device specific information used to update the centralized storage is accessible to a plurality of components in the device receiving unit.

4. The method of claim 1, wherein the device receiving unit has a plurality of receptacles for storing a plurality of devices, and wherein an earlier stored device may be replaced by a new device in the device receiving unit.

5. A system, comprising:
   a memory; and
   a processor coupled to the memory, wherein the processor performs operations, the operations comprising:
   maintaining a persistent storage in a device receiving unit that is configurable to receive one or more devices;
   receiving, in the device receiving unit, a first device that includes device specific information that identifies the first device, and also receiving, at the device receiving unit, a second device at the same time as the first device;
   determining, via first information exchange between the first device and the device receiving unit and via second information exchange between the second device and the device receiving unit, which of the first device and the second device has precedence;
   in response to determining, that the first device has precedence, starting updating of the persistent storage of the device receiving unit via the first device;
   in response to completion of the updating of the persistent storage of the device receiving unit by the first device, sending, by the device receiving unit, a proceed signal to the second device; and
   in response to the sending of the proceed signal to the second device, starting updating of the persistent storage of the device receiving unit via the second device, and in response to completion via the second device of the updating, sending a completion signal to the device receiving unit.

6. The method of claim 5, wherein:
   the device receiving unit comprises a chassis having storage devices and receptacles for storing received devices;
   the device is a redundant array of independent disks (RAID) switch with a controller card;
   the device specific information comprises vital product data (VPD) that identifies the device.

7. The method of claim 5, wherein the persistent storage is a centralized storage within the device receiving unit, and wherein the device specific information used to update the centralized storage is accessible to a plurality of components in the device receiving unit.

8. The method of claim 5, wherein the device receiving unit has a plurality of receptacles for storing a plurality of devices, and wherein an earlier stored device may be replaced by a new device in the device receiving unit.

9. An article of manufacture, wherein the article of manufacture is capable of causing operations on a machine, the operations comprising:
- maintaining a persistent storage in a device receiving unit that is configurable to receive one or more devices;
- receiving, in the device receiving unit, a first device that includes device specific information that identifies the first device, and also receiving, at the device receiving unit, a second device at the same time as the first device;
- determining, via first information exchange between the first device and the device receiving unit and via second information exchange between the second device and the device receiving unit, which of the first device and the second device has precedence;
- in response to determining, that the first device has precedence, starting updating of the persistent storage of the device receiving unit via the first device;
- in response to completion of the updating of the persistent storage of the device receiving unit by the first device, sending, by the device receiving unit, a proceed signal to the second device; and
- in response to the sending of the proceed signal to the second device, starting updating of the persistent storage of the device receiving unit via the second device, and in response to completion via the second device of the updating, sending a completion signal to the device receiving unit.

10. The article of manufacture of claim 9, wherein:
- the device receiving unit comprises a chassis having storage devices and receptacles for storing received devices;
- the device is a redundant array of independent disks (RAID) switch with a controller card;
- the device specific information comprises vital product data (VPD) that identifies the device.

11. The article of manufacture of claim 9, wherein the persistent storage is a centralized storage within the device receiving unit, and wherein the device specific information used to update the centralized storage is accessible to a plurality of components in the device receiving unit.

12. The article of manufacture d of claim 9, wherein the device receiving unit has a plurality of receptacles for storing a plurality of devices, and wherein an earlier stored device may be replaced by a new device in the device receiving unit.

13. A method for deploying computing infrastructure, comprising integrating machine-readable code into a machine, wherein code is combination with the machine is capable of performing:
- maintaining a persistent storage in a device receiving unit that is configurable to receive one or more devices;
- receiving, in the device receiving unit, a first device that includes device specific information that identifies the first device, and also receiving, at the device receiving unit, a second device at the same time as the first device;
- determining, via first information exchange between the first device and the device receiving unit and via second information exchange between the second device and the device receiving unit, which of the first device and the second device has precedence;
- in response to determining, that the first device has precedence, starting updating of the persistent storage of the device receiving unit via the first device;
- in response to completion of the updating of the persistent storage of the device receiving unit by the first device, sending, by the device receiving unit, a proceed signal to the second device; and
- in response to the sending of the proceed signal to the second device, starting updating of the persistent storage of the device receiving unit via the second device, and in response to completion via the second device of the updating, sending a completion signal to the device receiving unit.

14. The method for deploying computing infrastructure of claim 13, wherein:
- the device receiving unit comprises a chassis having storage devices and receptacles for storing received devices;
- the device is a redundant array of independent disks (RAID) switch with a controller card;
- the device specific information comprises vital product data (VPD) that identifies the device.

15. The method for deploying computing infrastructure of claim 13, wherein the persistent storage is a centralized storage within the device receiving unit, and wherein the device specific information used to update the centralized storage is accessible to a plurality of components in the device receiving unit.

16. The method for deploying computing infrastructure of claim 13, wherein the device receiving unit has a plurality of receptacles for storing a plurality of devices, and wherein an earlier stored device may be replaced by a new device in the device receiving unit.

* * * * *